J. HARVEY.

Bone Handles for Canes, &c.

No. 6,513. Reissued June 29, 1875.

WITNESSES:

A Bennemann Jr.

Alex F. Roberts

INVENTOR:

J. Harvey,

BY Munn & Co

ATTORNEYS.

THE GRAPHIC CO. PHOTO-LITH. 39 & 41 PARK PLACE, N.Y.

UNITED STATES PATENT OFFICE.

JOSEPH HARVEY, OF PHILADELPHIA, PENNSYLVANIA, ASSIGNOR TO HARVEY & FORD.

IMPROVEMENT IN BONE HANDLES FOR CANES, &c.

Specification forming part of Letters Patent No. 66,586, dated July 9, 1867; reissue No. 6,513, dated June 29, 1875; application filed April 10, 1875.

*To all whom it may concern:*

Be it known that I, JOSEPH HARVEY, of Philadelphia, in the county of Philadelphia and State of Pennsylvania, have invented a new and useful Improvement in the Manufacture of Bone Handles for Parasols, Canes, &c., of which the following is a specification:

Bone has long been used as a material for the manufacture of parasol, umbrella, and other handles; but it is not employed as extensively as it would be, provided stock could be obtained of sufficient size. To obviate this difficulty my invention consists in constructing a bone handle of a plurality of pieces, by cutting the bones into pieces of suitable form for building up the handles, and fastening them together, thus making handles of the largest required size for various articles, such as canes, umbrellas, parasols, &c.

The stock for bone handles is obtained from the shin-bones of beeves, as these furnish the largest pieces. These bones are sawed longitudinally, forming pieces more or less angular or irregular in form in their transverse section.

Figure 1:
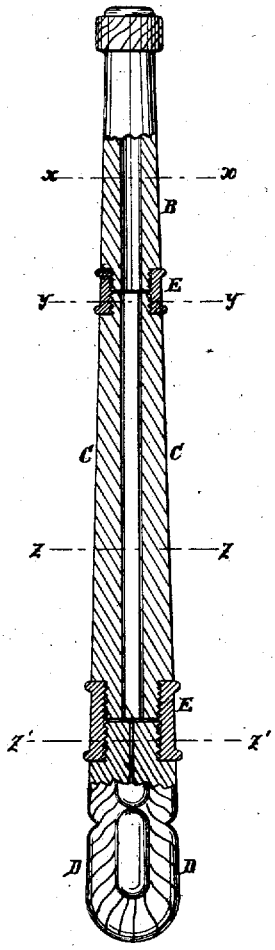
Figure 2:
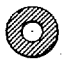
Figure 3:
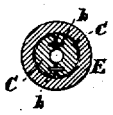
Figure 4:
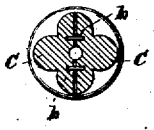
Figure 5:
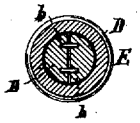
Figure 6:
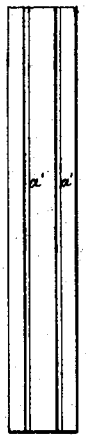
Figure 7:
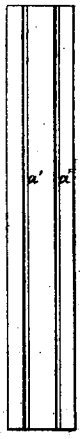
Figure 8:
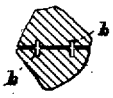
Figure 9:
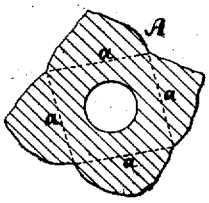

In the accompanying drawings, Figure 1 is a longitudinal central section of a handle, constructed of pieces fastened together; Figs. 2, 3, 4, and 5, transverse sections of the same, taken, respectively, in the lines *x x*, *y y*, *z z*, *z′ z′*, Fig. 1; Figs. 6 and 7, inner side views of two pieces of bone prepared to be secured together longitudinally to form the middle portion of the handle; Fig. 8, a transverse section or end view of the two parts shown in Figs. 6 and 7, when connected together; Fig. 9, a transverse section or end view of a shin-bone, from which the several pieces forming the handle are sawed.

Similar letters of reference indicate corresponding parts.

A, Fig. 9, represents an end view or transverse section of a shin-bone, which is sawed longitudinally, as indicated by the lines *a*, to obtain the several pieces, as B C C D D, which are all shown in Fig. 1, or otherwise for pieces of other required form. The inner and smaller part B of the handle is turned out of one of the longitudinal strips sawed from the bone A. The parts C C are two of said pieces made smooth at their flat or plane sides, which are to be fitted together and fastened, which may be done in various ways, as by glue and by ferrules fitted on or rings fitted in the ends, or pinned; and they may, if desired, have two parallel longitudinal grooves, *a′ a′*, made in them to receive strips of flat wire *b*, covered with thin cloth, and be glued together, the wire *b* giving additional surface for the glue, and preventing any lateral movement of the parts; but any other practicable mode of fastening them may be employed. These parts may alone form the handle, having any approved finish at the ends, or they may be turned in cylindrical form at the ends, and have ferrules E of bone screwed on and connecting end pieces B and D D, or other pieces. The ferrules E and the part B will be sawed transversely from the bone, and turned and properly fitted; but the part D D will be made of two or more pieces sawed longitudinally and transversely, and fastened together to make the requisite size.

It will be seen that bone handles, quite large in diameter, and of any suitable length, may be obtained, and in certain cases, where unusually thick handles may be required, three or more parts, like C C D D, may be secured together, and turned or carved in any desired form. Hence the great difficulty hitherto experienced in the smallness of the bone stock for handles is fully obviated, and a very neat, ornamental, and economical handle obtained.

Having thus described the invention, we claim as new and desire to secure by Letters Patent—

1. A bone handle for parasols, umbrellas, and canes, consisting of longitudinal sections C, fastened substantially as described.

2. A bone handle for parasols, umbrellas, and canes, made of end sections B D and median sections C C, connected by ferrules E E, as shown and described.

HARVEY & FORD.

Witnesses:
T. B. MOSHER,
ALEX. F. ROBERTS.